June 18, 1940.  H. J. TYZZER  2,204,873
AUTOMOTIVE RADIO APPARATUS
Original Filed April 7, 1938  2 Sheets-Sheet 1

INVENTOR.
HOWARD J. TYZZER.
BY Allen & Allen
ATTORNEYS.

June 18, 1940.　　　　H. J. TYZZER　　　　2,204,873
AUTOMOTIVE RADIO APPARATUS
Original Filed April 7, 1938　　2 Sheets-Sheet 2

INVENTOR.
HOWARD J. TYZZER.
BY
Allen & Allen
ATTORNEYS.

Patented June 18, 1940

2,204,873

UNITED STATES PATENT OFFICE 2,204,873

AUTOMOTIVE RADIO APPARATUS

Howard J. Tyzzer, Cincinnati, Ohio, assignor to The Crosley Corporation, Cincinnati, Ohio, a corporation of Ohio Original application April 7, 1938, Serial No. 200,730. Divided and this application August 9, 1939, Serial No. 289,287

2 Claims. (Cl. 74—10)

This application is a division of my co-pending application, Serial No. 200,730, filed April 7, 1938, and entitled Automotive radio apparatus.

My invention relates to radio apparatus for use in automobiles or other types of vehicles, which apparatus is equipped with station selecting mechanism. In the operation of an automobile radio set, for example, if the tuning in of various stations requires both manipulation and visual inspection on the part of the operator, his attention is diverted from his driving with a consequent serious safety hazard. An object of my invention, therefore, is the provision of a radio installation in a motor vehicle or the like which may be operated by the driver without the necessity of any visual inspection at all.

Still another object of my invention is the provision of automatic apparatus, the cost of which is not appreciably greater, if greater at all, than the cost of automotive radio equipment not making any provision for securing the objects of my invention. In other words, it is one of my objects to secure ease, convenience, and safety of operation as aforesaid, without adding to the cost of the radio set. I am aware that radio sets with remote control devices have been constructed in accordance with several plans; but it is not very feasible, excepting at considerable added cost and unusual power requirements, to equip automobile radios with such devices. Moreover there is a distinct installation problem which adds to the ultimate cost to the purchaser. Again, such systems are likely to get out of order and to lose temporarily, at least, any value they might otherwise have in a radio set for vehicles.

Thus, it is further an object of my invention to provide a means for controlling an automobile radio set which means is simple, accurate, effective, and not liable to get out of order under any normal conditions of the operation of the vehicle. Also, it is my object to produce an automotive radio set equipped with control means as aforesaid, but which is installed as other automotive radio sets are installed or even with less labor, and in any even without any additional cost, inconvenience, labor or expenditure of time.

These and other objects of my invention which will be set forth hereinafter, or will be apparent to one skilled in the art upon reading these specifications, I accomplish by that certain construction and arrangement of parts of which I shall now describe an exemplary embodiment. Reference is made to the drawings wherein.

Figure 1:
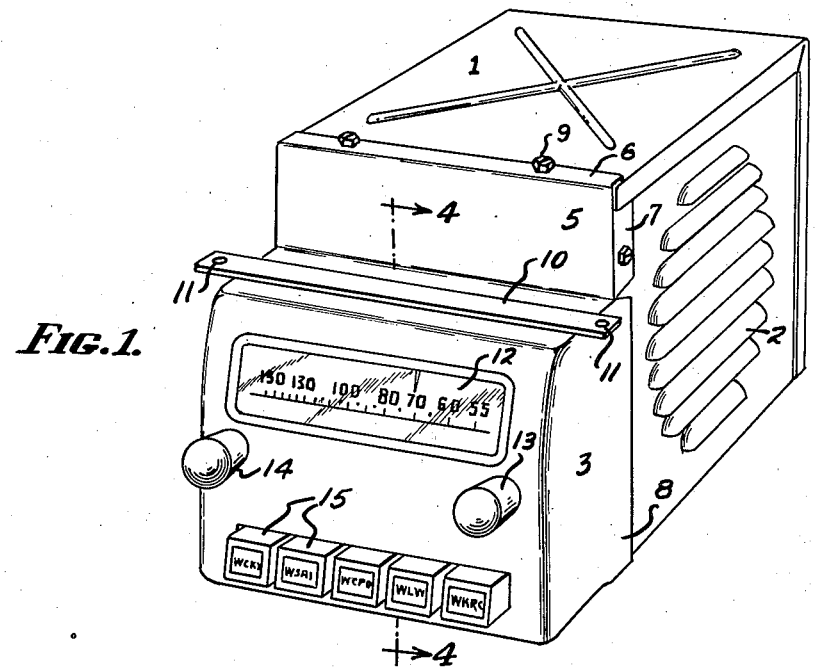
Figure 1 is a perspective view of an automotive radio set embodying my invention.

Briefly, in the practice of my invention, I provide an automotive radio set equipped with a dial and the usual tuning knob for manual operation where so desired. The device is, however, also equipped with a series of plungers or push buttons by which the operator may instantly tune in any one of a number of preselected stations for which the apparatus has been set. The usual volume control knob, also operating a switch for turning the radio set off and on, is likewise provided. The volume control switch may be operated by the driver without any visual inspection as will be clear; and so long as the driver is aware of the order of the push buttons, he can likewise select and actuate any one of them without withdrawing his attention from driving.

The several push buttons and attendant portions, constitute a selective mechanism which is connected directly or through a suitable drive to the condenser gang or other tuning elements of the radio set. In this connection, reference may be made to my co-pending application Serial No. 192,258 filed February 24, 1938, and entitled a Push button tuning device, in which I have shown a similar selective mechanism. Also reference may be made to my copending application, Serial No. 226,520 filed August 24, 1938, and entitled a Push button tuning device, in which I have described a simplified selective mechanism in which the rotor blades of the condenser or condensers, are directly connected to the member which is positioned by the selective devices. It will be within the skill of the worker in the art, to employ this latter type of mechanism if he so desires. In this specification, I shall describe but one type of selective mechanism, it being understood that other types may be employed within the spirit and scope of my invention. I am not claiming herein selective mechanism per se; but I am claiming such mechanism generally as an element in a combination of other parts going to make up a structure for automotive installation.

In my device, the plungers and associated selective mechanism are mechanically connected to the condenser gang and must be located adjacent the condenser gang. I, therefore, provide substantially as a unit, the combination of condenser gang, selective mechanism, the dial and the various controls. While this may be built into a complete casing as a separate unit which may be located where desired in the automotive vehicle, I prefer to build the unit, in the form of an extension upon the usual cabinet in which the radio set is housed, for purposes hereinafter to be explained.

Where the combination of condenser, selective mechanism, and indicating and controlling means is built into an extension upon the radio cabinet or casing, it is possible to install the radio set in the vehicle in substantially the ordinary way and still have the selective and controlling mechanism available to the operator of the vehicle. Thus the casing may be installed behind the instrument panel with the extension projecting beneath the lower edge thereof in position of convenient access to the operator, or it is possible to mount the casing behind the instrument panel with the casing extension projecting through an appropriately shaped aperture in the instrument panel, thereby securing a somewhat more finished appearance.

I shall now proceed to a specific description of an exemplary embodiment of my device. Reference to Fig. 1 will show a casing 1, of usual type for an automotive radio set. This casing contains the chassis and appurtenances of the radio set, which elements do not require description. Also, the casing as manufactured, contains the loud speaker which emits sound through louvres 2. If desired, of course, the loud speaker may be located elsewhere in the vehicle. Likewise the power pack may be in the casing or elsewhere as may be found most convenient.

The front of the casing is provided with an extension 3, which may have the ornamental shape shown or any other shape deemed equally suitable. A convenient way of making this extension is by drawing or stamping sheet metal. It is to be noted that the extension is shorter in height than the casing 1, for a reason which will be clear hereinafter. In forming the extension, I prefer to make it as a complete closure for one side of the casing 1, to which end the extension is provided with a vertically extending portion 5. Flanges 6, 7, and 8, are formed upon the extension member to go over the edges of the casing; and the extension may be fastened to the casing by means of screws or bolts 9. Attached to the top of the extension proper, is a relatively heavy bar 10, which may with advantage, be spot-welded to the extension. This bar is for installation purposes. It may project beyond the side edges of the extension and be provided with perforations 11.

The front portions of the extension is provided with a dial arrangement indicated generally at 12, with a manual turning knob 13, with a combined switch and volume control knob 14, and with a plurality of push buttons 15. These push buttons are provided with markers as shown; and the arrangement of parts within the extension 3 is such that when the radio set is turned on by means of the knob 14, the operation of pushing in any selected one of the buttons 15, will turn the radio set to a preselected station. A specific embodiment of mechanism whereby this may be accomplished will be set forth later in these specifications.

Figure 2:
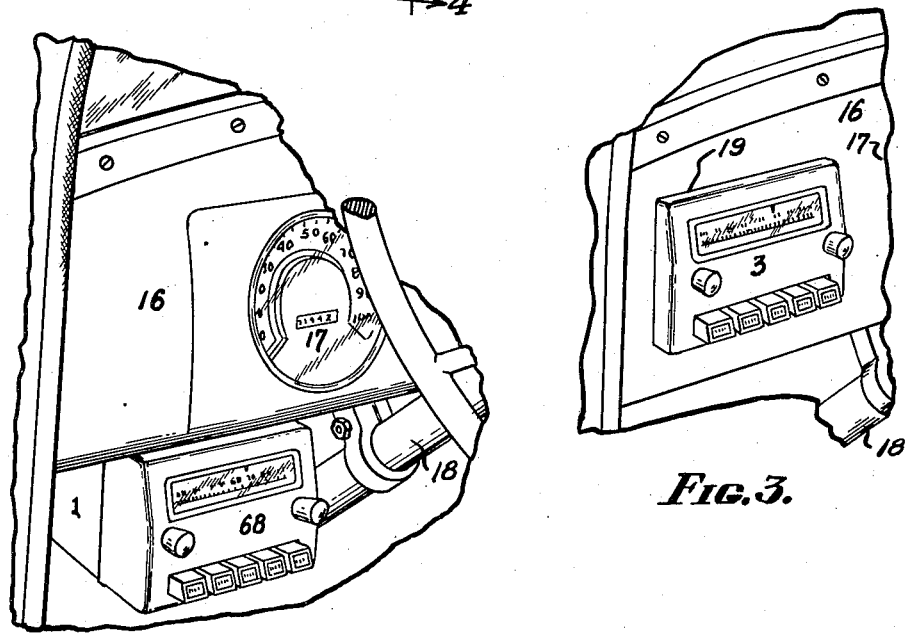
Fig. 2 is a perspective view of one method of installing the radio set of Fig. 1 in an automobile.
Figure 3:
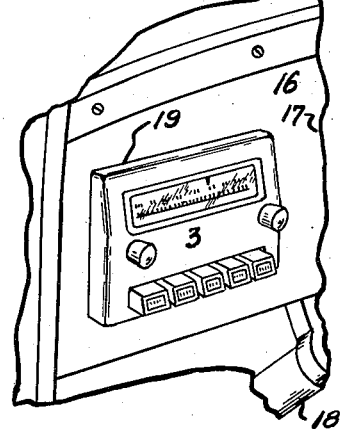
Fig. 3 is a perspective view of another method of installation.

Particular methods of installation are shown in Figs. 2 and 3. In Fig. 2, I have illustrated a portion of an automobile having an instrument panel 16, with the speedometer 17, and other instruments thereon. Here the apparatus of Fig. 1 has been installed by locating the casing 1, essentially behind the instrument panel but with the extension 3 there below, and projecting forwardly. In this instance, the casing 1 has been mounted, in part at least, by fastening the bar 10 to the flange at the lower edge of the instrument panel 16. The casing 1, may have additional support as desired, by attaching it to the dash, for example. In Fig. 2, the casing 1, with its extension 3, is shown located to the left of the steering post 18 in a position of easy access for the driver. It will be understood, of course, that my device may be similarly mounted in substantially any position along the length of the instrument panel.

In Fig. 3 the instrument panel 16 is shown as having a perforation 19, through which the extension 3 projects. The casing 1 is, in this instance, located wholly behind the instrument panel.

Figs. 2 and 3 are illustrative of exemplary mountings for my device; but other mountings may likewise be employed. It will be observed, however, that the device is of such character that it may be installed in an automotive vehicle as a unit without requiring the separate installation of control elements and the connection of these elements to a radio set located elsewhere. It will also be observed that my device when installed has a pleasing and decorative effect in consonance with the fittings of the vehicle. The extension 3 is finished with a suitably decorative surfacing, and may be made to match the finish of the instrument panel.

Figure 5:
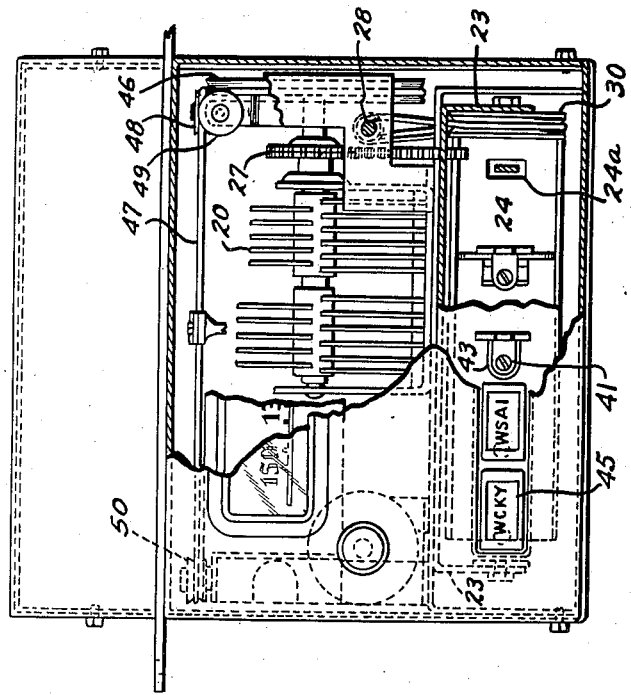
Fig. 5 is a front view of the device of Fig. 1 with portions broken away so as to show the control apparatus in elevation.
Figure 6:
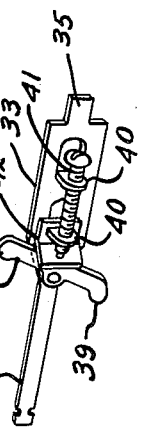
Fig. 6 is a perspective view of a plunger element which I may employ.
Figure 4:
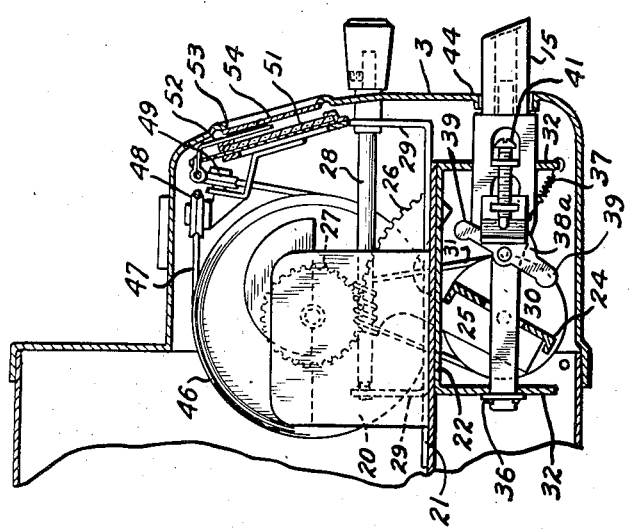
Fig. 4 is a sectional view through the device of Fig. 1 taken along the lines 4—4. The view is partial and shows the essential features of the control apparatus.

Figs. 4, 5 and 6 show the mechanism within the extension 3. A condenser gang is broadly indicated at 20 having stator and rotor blades. The condenser gang can be separately mounted in the extension if desired, and this will be done where the extension casing and associated parts are constructed as a separate unit for mounting in the vehicle in a different position from the remainder of the radio set; but in the form of a device illustrated in Fig. 1, it is convenient to mount the condenser gang upon an extension of the chassis of the radio set indicated at 21. Beneath the condenser gang, I mount a box like frame 22. Down-turned ears 23 on the ends of this structure are provided with bearing means for a rocking plate 24. This plate bears an arm 25 having gear teeth 26 meshing with the teeth of a gear 27 fixed on the shaft of the gang condenser 20. It will, thus, be clear that if the plate 24 is rocked, it will control the position of the rotor assembly of the condenser gang.

A manual control shaft 28 is journaled in ears 29 on the chassis. The rocking plate 24 bears a pulley 30. A cable 31 passes about this pulley and is wound about the shaft 28 as shown. The shaft 28 carries the tuning knob 13. If this knob is rotated, the shaft 28, through the cable 31, rocks the plate 24. This in turn moves the condenser gang as aforesaid. The so-called automatic tuning means for the radio set also adjusts the condenser by moving the plate 24. To this end, the bearings of the shaft 28 are made to have very little frictional resistance so as not to interfere with this operation.

In downwardly extending ears 32 on the member 22, I slidably mount a number of plungers. These plungers are illustrated in Fig. 6. Each comprises a body portion 33, a rearwardly extending reduced portion 34, and a forwardly extending reduced portion 35. The portion 34 passes through perforations 24a in the rocking plate 24, so as not to interfere with the movements of the plate. Where the reduced end portion 34 of each plunger extends through the rearward ear 32, a suitable fastening means 36 may be provided to limit movement of the plungers in the forward direction. A coil spring 37 extending between the body 33 of each plunger and the forward ear 32 is employed to keep the several plungers normally in the forward position.

To each of the plungers, I pivot an actuating arm 38 having contacting portions 39 to be brought against the plate 24 for positioning it. In the operation of setting the apparatus for any given station, the radio set is first tuned to that station by means of the hand tuning knob 13. Then a plunger which has been selected for that station is depressed. With the arm 38 loose on that plunger, it will be clear that the arm 38 will be given a position appropriate to the selected station by the plate 24. If now the arm 38 is fixed in that position on the plunger, it will be clear that thereafter, when the plunger is depressed, the arm 38 will give to the plate 24 its former position and will thereby tune in the previously selected station.

As set forth in my co-pending applications referred to, there are several ways in which the arm 38 may be fixed upon the plunger. In the particular construction illustrated, I have struck up ears 40 from the body 33 of the plunger and have threaded into these ears a set-screw 41. A locking plate 42 of angular form is perforated so as to slip over the rearward ear 40. The end of the set-screw 41 bears against an angularly bent portion of the locking plate 42 as shown and binds the locking plate against a forwardly extending semicircular portion 38a of the positioning arm 38.

The perforations in the upward ear 32 of the member 22 are enlarged as at 43 to accommodate the ears 40. In the particular embodiment shown, the push buttons 15 are frictionally engaged upon the forward extensions 35 of the plungers. The push buttons are of sufficient width to cover the set-screws 41, and, side by side, substantially fill up the entire space within a perforation 44 in the extension 3.

In setting the device for any given station, the push button 15 for the selected station, is pulled off the extension 35, and the apropriate adjustments made. After this, the push button is replaced. The push buttons may be provided with removable markers 45 so that they may be marked with the call letters of the selected station.

I have illustrated one form of dial construction in the several figures. Here a pulley 46 is attached to the end of the condenser gang shaft. An endless cable 47 passes over this pulley, over supplementary pulleys 48 and 49 at the right hand end of the structure, and returns over a pulley 50 at the left hand end of the structure. A suitable scale means 51 is supported in the position shown, and a pointer 52 which is attached to the cable 47 moves over this scale. The extension 3 will be perforated as at 53 to disclose the scale and pointer; and the perforation may be covered with a glass 54 or other suitable translucent substance.

If desired, the condenser 20, the dial and the selective apparatus substantially in the relationship described may be placed in a separate casing, finished on all sides and located wherever desired in the motor vehicle. When so constructed and located away from the radio set proper, the condenser will be wired to the set, as will be understood by the skilled worker in the art, and the volume control knob will likewise be wired to the set. Great complexity of wiring is avoided because the selective mean acts mechanically and substantially directly upon the condenser.

Modifications may be made in my invention without departing from the spirit of it.

Having thus described my invention, what I claim as new and desire to secure by Letters Patent is:

1. In an automobile radio set, a casing, an extension thereof, a radio set in said casing, a condenser gang located at least partially within said extension, mounting means below said condenser gang in said extension, a plate pivoted on said gang in said extension, a plate pivoted on said mounting means, a connection between said plate and said condenser gang, a series of plungers slidably mounted in said mounting means and extending transversely to said plate, each of said plungers bearing positioning means for said plate, adjusting means for said positioning means and operating knobs on said plungers, said operating knobs extending forwardly through a perforation in said extension, said operating knobs being of a size to fill up the said perforation in said extension, and being removable to permit access to said adjusting means.

2. In an automotive radio apparatus, a housing, a condenser gang in said housing, an elongated dial for said condenser gang, a perforation in the upper part of one side of said housing for disclosing said dial, said housing bearing therebelow on said side a pair of knobs for controlling a radio set and below said knobs having an elongated perforation, a series of plungers extending through said last mentioned perforation in side by side relationship, said plungers being so shaped as substantially to fill up said perforation when in side by side relationship, said plungers having means for operating said condenser gang so as to tune it to preselected stations, said plungers being substantially rectangular in cross section.

HOWARD J. TYZZER.